No. 121,762. H. Davies. Blast Furnace.

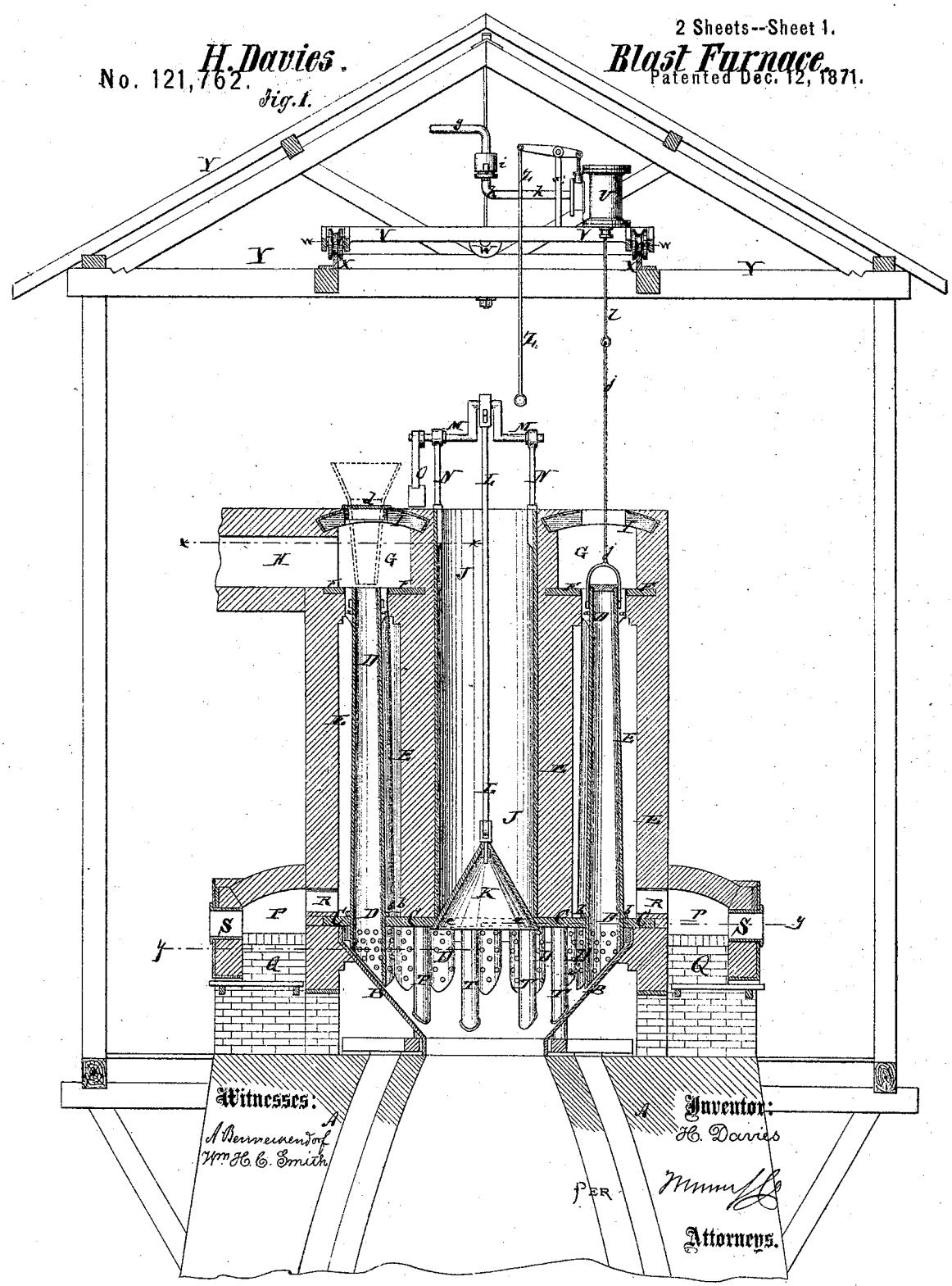

2 Sheets--Sheet 2.
Patented Dec. 12, 1871.

Witnesses:
A. Bennewendorf
Wm. H. C. Smith

Inventor:
H. Davies
per
Attorneys.

No. 121,762

UNITED STATES PATENT OFFICE.

HENRY DAVIES, OF NEWPORT, KENTUCKY.

IMPROVEMENT IN BLAST-FURNACES.

Specification forming part of Letters Patent No. 121,762, dated December 12, 1871.

*To all whom it may concern:*

Be it known that I, HENRY DAVIES, of Newport, in the county of Campbell and State of Kentucky, have invented a new and useful Improvement in Blast-Furnaces; and I do hereby declare that the following is a full, clear, and exact description thereof, which will enable others skilled in the art to make and use the same, reference being had to the accompanying drawing forming part of this specification.

Figure 3:
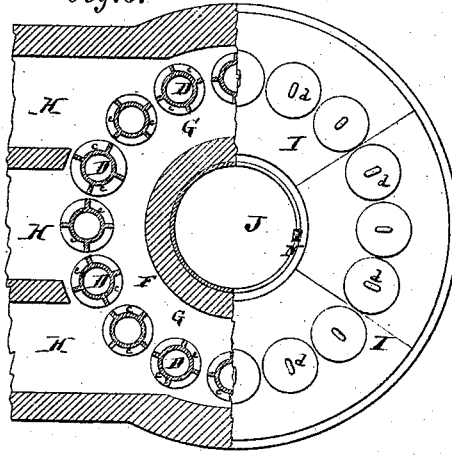
Figure 2:
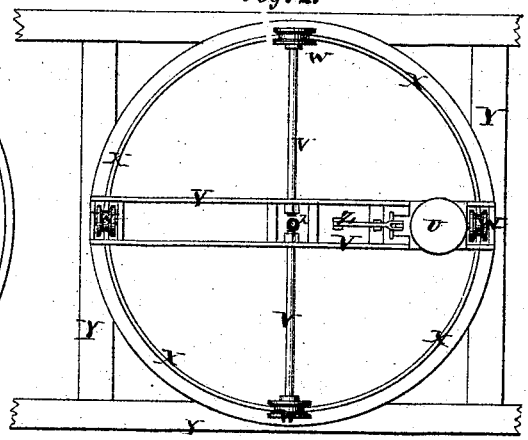
Figure 4:
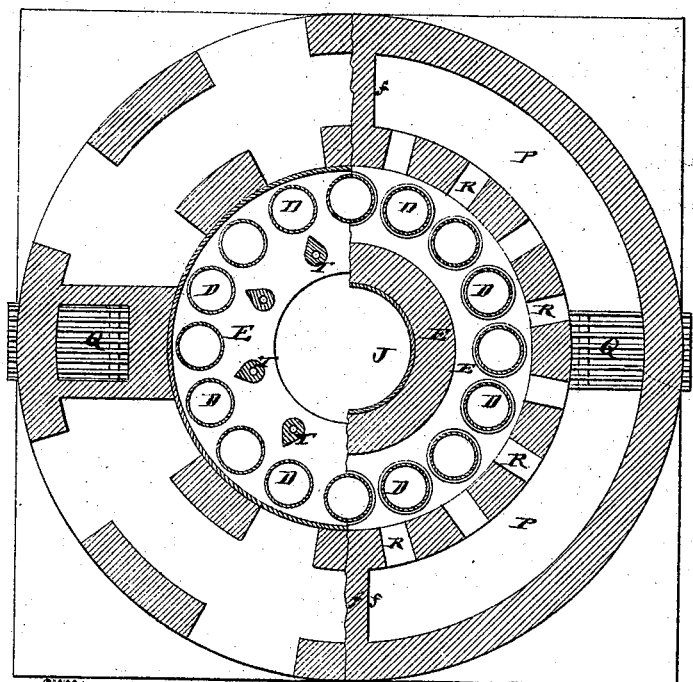

Figure 1 represents a vertical longitudinal section of my improved blast-furnace. Fig. 2 is a plan or top view of the machinery used on my improved furnace. Fig. 3 is a top view, partly in section, of the furnace, the plane of section being indicated by the line $x\ x$, Fig. 1. Fig. 4 is a horizontal section of the furnace taken on the plane of the line $y\ y$, Fig. 1.

Similar letters of reference indicate corresponding parts.

This invention has for its object to improve blast-furnaces in such a manner that the gases, generally termed "waste gases," will be utilized, together with all the products of combustion. The invention consists in such a construction and arrangement of the furnace and of the machinery connected therewith that the gases will be conducted in the desired manner, to be entirely consumed or utilized.

A in the drawing represents the upper portion of a blast-furnace. B is an inverted truncated conical hopper, placed upon the top of the furnace. The upper end of the hopper terminates in a short cylinder, which sustains a circular plate, C. The plate C has a large central aperture, $e$, and a series of smaller openings, say sixteen, arranged in a circle around its outer part. Through these outer apertures are fitted as many vertical pipes D D, which extend upward to a considerable distance and downward nearly to the sides of the hopper, being beveled parallel with the same, as shown in Fig. 1. The pipes D below the plate C are perforated with small holes, as is clearly shown in Fig. 1. The pipes D are made of tapering form, being smaller in diameter at the upper than they are at their lower ends. From the outer side of each pipe D projects, at the upper part of the same, a number of wings, $a\ a$, which project so far that their outer ends are in line with the edge of a collar, $b$, which supports each pipe D on the plate C. E is a double cylindrical casing of brick-work, forming an annular chamber, within which the pipes D are contained. F is a cast-iron annular plate, covering the chamber E, and receiving the upper ends of the pipes D. The wings $a$ on D fit the holes in the plate F so as to leave small apertures $c\ c$ round the upper part of each pipe D. G is an annular chamber, formed of brick-work, above the plate F, and communicating with one or more horizontal flues, H. I is the cover of the annular chamber G. It is made of cast-iron, lined with fire-brick, and has a series of openings, covered with lids $d$, one being above each pipe D. J is a cylindrical chamber in the center of the furnace. It is preferably lined with cast or wrought iron. K is a cone closing the chamber J at the bottom. L is a rod from which the cone K is suspended. M is a crank-shaft, supported by standards N at the top of J, the rod L being connected to M, as seen in Fig. 1. O is a weight attached to the shaft M, and made heavy enough to balance the cone K and to close the same against the lower end of J. P P are two semi-annular flues, arranged around the bottom of E, and separated from each other by partitions $f$. Each flue or chamber P is provided with a fire-place, Q, in the center. R R are a number of small flues leading from the flues P into the lower part of the chamber E, as in Figs. 1 and 4. S S are the stock-holes for feeding the grates Q with fuel. T T are standards or columns passing through the hopper B to aid in supporting the plate C and the load upon it, the lower ends of the columns resting on suitable supports. U is a steam cylinder fixed upon a frame, V, which is mounted upon three wheels or rollers, W, that sustain it on a circular track, X, as shown in Fig. 2. The track X is fixed in the roof of the bridge-house Y, or upon any suitable frame-work, concentric with and above the ring of pipes D and chamber J, and of sufficient height to be out of headway. $g\ h$ are the steam-pipes to U. It is provided with a stuffing-box, $i$, over the center of the track X, to allow the frame V to turn round with its cylinder U. $j$ is a rod with bifurcated lower end, each prong having a hook. The upper end of the rod $j$ also has a hook, which is hooked into the piston-rod $l$ of the cylinder U, while the lower prongs lock into the perforated wings $a$ of one of the pipes D, and may be attached or detached at pleasure. Two of the wings $a$ of each pipe D have holes in them for receiving the prongs of the rod *j*. Z is a rod to the valve lever, to operate the cylinder U.

The operation is as follows: The furnace being filled, in the usual way, with alternate charges of iron ore, flux, and charcoal or other fuel, through the center opening J, (the cone being let down for that purpose,) the pipes D are filled with ore through a suitable movable hopper, as indicated by the dotted lines in Fig. 1. This hopper is then removed and the covers *d* put on and the cone K closed, as shown. The fires at Q having been started, the gases from them will pass right and left through the circular flues P, and through the small radial flues R into the chamber E, heating the pipes D with the ore in them, and escape into G through the small holes *c* round the pipes D into the plate F. The furnace being started, or the blast being put out, the gases from the top of the furnace will be driven through the small holes in the bottom of the pipes D and through the ore in them, the same having been heated by the fires at Q to a sufficient temperature to insure the combustion of the spare carbon of the gas from the furnace with the oxygen of the ore. The products of this combustion will be discharged into G as carbonic acid, where it will mingle with the gases from Q and pass off through the flues H. As soon as the furnace requires a charge the necessary quantity of fuel is dumped into the center opening or cylinder J and rests upon the cone K. The weight O is then lifted and the cone lowered, when the fuel slides into the furnace. The weight, when let go, closes the cone K again. One of the lids *d* is now removed. The rod *j* is hooked into the piston-rod of U and to the pipe D, as shown. The rod Z is then pulled so that the steam will be turned on, and the piston with the pipe D raised to allow the ore to run out of D into the furnace. The empty pipe D is now let down again, and the rod *j* removed, the pipe being refilled with ore, as before. Such pipe is then covered with a suitable cap to prevent the gases from passing through the fresh ore until it is sufficiently heated to insure its taking up the surplus carbon of the gas, when the cap is removed and the gas allowed to pass through as before. When another charge is required the coal will be put in, as before. The frame V with its cylinder U is turned half round, and the cylinder brought over the pipe D opposite the last one. Such pipe is then raised, discharged, and refilled, and capped in the manner before described, and so on with all pipes. Care should be taken to discharge opposite pipes, as near as possible, as this will tend to keep the work of the furnace regular.

It will be readily seen that if all the gas, after passing through the ore in the pipes, is rendered to carbonic acid, the ore will be reduced in proportion to the carbonic oxide in the gases escaping from the furnace, rendering less carbon necessary to complete the reduction of the ore to the metallic state in the furnace, and a saving of fuel will be the result. The nitrogen contained in the gas will not be affected by the process, serving merely as a vehicle for the oxygen of the air.

In the foregoing is described the mode of heating the pipes by means of the flues at Q; but it may be necessary, where stone-coal is scarce, to use a portion of the waste gas for heating up the pipes and ore as described, which may be done in the following manner: The plate C may have a suitable number of small holes between the pipes D, large enough to allow a sufficient quantity of gas to enter the chamber E for heating the pipes D and the ore in them, when a sufficient quantity of air is admitted through the openings or flues R to burn the gas. As the gas may be admitted into the fire-places Q, the ash-pit being stopped up, but leaving sufficient opening for the air to enter for combustion with the gas from the furnace top, the fire-place Q and flues P P will serve as a combustion chamber, and the products pass through the flues R into E and heat up the pipes and ore, as described.

Having thus described my invention, I claim as new and desire to secure by Letters Patent—

1. The series of pendent and movable chambers D, perforated near the bottom, combined in a blast-furnace, with and resting upon the sides of an inverted conical hopper, B, as described, so that heat can first be applied to said chambers to raise the temperature of the ore therein, the products of combustion then be passed through said ore, and the said chambers then lifted to drop the ore into the furnace.

2. In a blast-furnace the series of fire-places Q, the flues P R, and the chamber E, arranged and applied to the chambers D, as and for the purpose set forth.

3. The steam-lifting device, arranged upon circular track X, and provided with a detachable and pendent catch to connect and disconnect with chambers D, as described.

4. The central fuel-inlet J, provided with a pendent and downwardly-movable cone K, to be let down to open said inlet to fuel for the furnace, and to be raised to close said inlet.

5. The process of first heating ore and then passing the products of combustion therethrough, as and for the purpose specified.

HENRY DAVIES.

Witnesses:
ALBERT T. ROOT,
GEO. SUMMERS.